United States Patent
Obiagwu et al.

(10) Patent No.: US 11,558,195 B2
(45) Date of Patent: Jan. 17, 2023

(54) PROOF-OF-WORK VEHICLE MESSAGE AUTHENTICATION

(71) Applicant: FORD GLOBAL TECHNOLOGIES, LLC, Dearborn, MI (US)

(72) Inventors: Francis Obiagwu, Warren, MI (US); John Moore, Canton, MI (US); Soodeh Dadras, Dearborn, MI (US); Sai Srikar Palukuru, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 16/783,978

(22) Filed: Feb. 6, 2020

(65) Prior Publication Data

US 2021/0250173 A1 Aug. 12, 2021

(51) Int. Cl.
| | |
|---|---|
| *H04L 12/18* | (2006.01) |
| *H04L 9/32* | (2006.01) |
| *G07C 5/00* | (2006.01) |
| *G07C 5/08* | (2006.01) |
| *H04L 67/12* | (2022.01) |

(52) U.S. Cl.
CPC ............ *H04L 9/3218* (2013.01); *G07C 5/008* (2013.01); *G07C 5/0841* (2013.01); *H04L 12/18* (2013.01); *H04L 67/12* (2013.01)

(58) Field of Classification Search
CPC ....... H04L 9/3218; H04L 12/18; H04L 67/12; G07C 5/008; G07C 5/0841
USPC .......................................................... 726/19
See application file for complete search history.

(56) References Cited

U.S. PATENT DOCUMENTS

| | | | |
|---|---|---|---|
| 7,600,255 | B1 | 10/2009 | Baugher |
| 8,132,005 | B2 | 3/2012 | Tarkkala et al. |
| 8,954,744 | B2 | 2/2015 | Sherkin et al. |
| 10,116,693 | B1 | 10/2018 | Robinson et al. |
| 2016/0078219 | A1 | 3/2016 | Hernan |
| 2018/0287915 | A1* | 10/2018 | Smith ................ H04L 51/23 |

(Continued)

FOREIGN PATENT DOCUMENTS

WO   WO-2017180382 A1 * 10/2017

OTHER PUBLICATIONS

Abubaker et al., Decentralized Mechanism for Hiring the Smart Autonomous Vehicles Using Blockchain, 14th International Conference on Broad-Band Wireless Computing, Communication and Applications (BWCCA 2019), University of Antwerp, Antwerp, Belgium, Aug. 2019.

*Primary Examiner* — Bryan F Wright
(74) *Attorney, Agent, or Firm* — Joseph M. Zane; Brooks Kushman P.C.

(57) ABSTRACT

A first connected message broadcast from a first vehicle and a second connected message broadcast from a second vehicle is received, each of the first and second connected messages including proof-of-work computed from connected vehicle data regarding a third vehicle. The first and second connected messages are authenticated, responsive to a comparison of the proof-of-work for the third vehicle included in the first connected message and the proof-of-work for the third vehicle included in the second connected message. The connected vehicle data in the first connected message broadcast or second connected message broadcast is utilized for autonomous vehicle operations or driver-assistance vehicle operations, responsive to the proof-of-work being a match.

20 Claims, 5 Drawing Sheets

(56) References Cited

U.S. PATENT DOCUMENTS

2020/0177569 A1\* 6/2020 Kleeberger ............. H04W 4/48
2021/0083876 A1\* 3/2021 Harms .................. H04L 9/3218

\* cited by examiner

PROOF-OF-WORK VEHICLE MESSAGE AUTHENTICATION

TECHNICAL FIELD

Aspects of the present disclosure generally relate to using proof-of-work for authentication of messages between vehicles.

BACKGROUND

Proof-of-work is a concept in which an exercise is performed that is computationally expensive to determine, but computationally easy to verify. Proof-of-work can be used in blockchain systems as a consensus algorithm to validate transactions that are gathered into blocks.

SUMMARY

In one or more illustrative examples, a system includes system for using proof-of-work for authentication of messages between vehicles, comprising a controller of an ego vehicle, programmed to receive a first connected message broadcast from a first vehicle and a second connected message broadcast from a second vehicle, each of the first and second connected messages including proof-of-work computed from connected vehicle data regarding a third vehicle, authenticate the first and second connected messages responsive to a comparison of the proof-of-work for the third vehicle included in the first connected message and the proof-of-work for the third vehicle included in the second connected message, and utilize connected vehicle data in the first connected message broadcast or second connected message broadcast responsive to the proof-of-work being a match.

In one or more illustrative examples, a method for using proof-of-work for authentication of messages between vehicles includes receiving a first connected message broadcast from a first vehicle and a second connected message broadcast from a second vehicle, each of the first and second connected messages including proof-of-work computed from connected vehicle data regarding a third vehicle, authenticating the first and second connected messages responsive to a comparison of the proof-of-work for the third vehicle included in the first connected message and the proof-of-work for the third vehicle included in the second connected message, and utilizing connected vehicle data in the first connected message broadcast or second connected message broadcast responsive to the proof-of-work being a match.

In one or more illustrative examples, a non-transitory computer readable medium comprising instructions for authentication of messages between vehicles, that when executed by a processor, cause the processor to perform operations including to receive a first connected message broadcast from a first vehicle and a second connected message broadcast from a second vehicle, each of the first and second connected messages including proof-of-work computed from connected vehicle data regarding a third vehicle, authenticate the first and second connected messages responsive to a comparison of the proof-of-work for the third vehicle included in the first connected message and the proof-of-work for the third vehicle included in the second connected message, and utilize connected vehicle data in the first connected message broadcast or second connected message broadcast for autonomous vehicle operations or driver-assistance vehicle operations, responsive to the proof-of-work being a match.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

In a connected vehicle environment, vehicles broadcast messages to other vehicles and to infrastructure. These messages are used to communicate the state of the vehicle as well as the state of the environment in which the vehicles operate. Data in the broadcast messages may be used for various purposes, such as for autonomous vehicle operations or driver-assistance vehicle operations. However, malicious attacks may be performed that disrupt or corrupt this message flow. Such an attack may be performed can to jam the network, flood the network, or send bogus messages with incorrect information. As explained in detail herein, a proof-of-work approach that leverages the existing broadcast messages may be utilized to address these types of attacks, thereby authenticating node-based results received from task given to other nodes.

Figure 1:
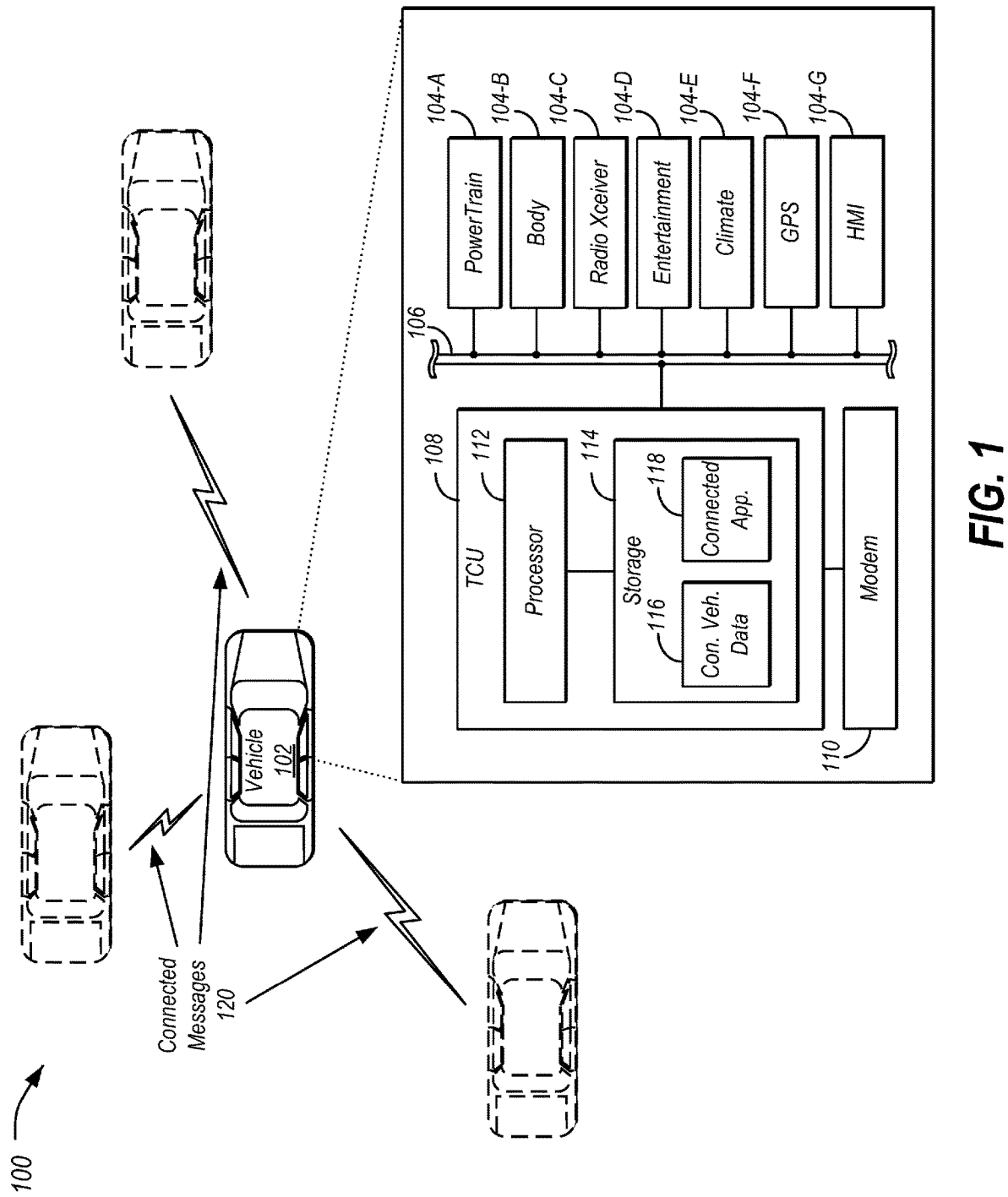
FIG. 1 illustrates an example vehicle for use in leveraging broadcast messages for calculation of proof-of-work.

FIG. 1 illustrates an example vehicle 102 for use in leveraging broadcast messages for calculation of proof-of-work. The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle ECUs 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with other vehicles 102 or with infrastructure. The TCU 108 may include various types of computing apparatus in support of performance of the functions of the TCU 108 described herein. In an example, the TCU 108 may include one or more processors 112 configured to execute computer instructions, and a storage 114 medium on which the computer-executable instructions and/or data may be maintained. A computer-readable storage medium (also referred to as a processor-readable medium or storage 114) includes any non-transitory (e.g., tangible) medium that participates in providing data (e.g., instructions) that may be read by a computer (e.g., by the processor(s)). In general, the processor 112 receives instructions and/or data, e.g., from the storage 114, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of connected vehicle data 116 and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The collected information retrieved from the controllers 104 over the vehicle buses 106 may be referred to as connected vehicle data 116. In many examples, the collected information data 116 may include information useful for autonomous vehicle operations or driver-assistance vehicle operations. The connected vehicle data 116 information retrieved by the TCU 108 may include, as some non-limiting examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data 116 information may also include, weather data (such as ambient temperature, ambient air pressure, etc.), traction control status, wiper status, or other vehicle status information (such as the status of exterior vehicle lights, type of vehicle, ABS system status, etc.)

The TCU 108 may store the collected connected vehicle data 116 to the storage 114 of the TCU 108 as shown. The TCU 108 may be further configured to periodically transmit the connected vehicle data 116 in connected messages 120 for reception by other vehicles 102. For instance, the periodicity may be on the order of every ten milliseconds. The TCU 108 may be further configured to receive connected messages 120 from other vehicles 102. In an example, the management of sending and receiving of connected vehicle data 116 may be handled by a connected application 118 executed by the TCU 108. In one example, the connected messages 120 may take the form of BSM messages as described in the SAE J2735, and the proof-of-work values may be added to the reserve section of the BSM.

Figure 2:
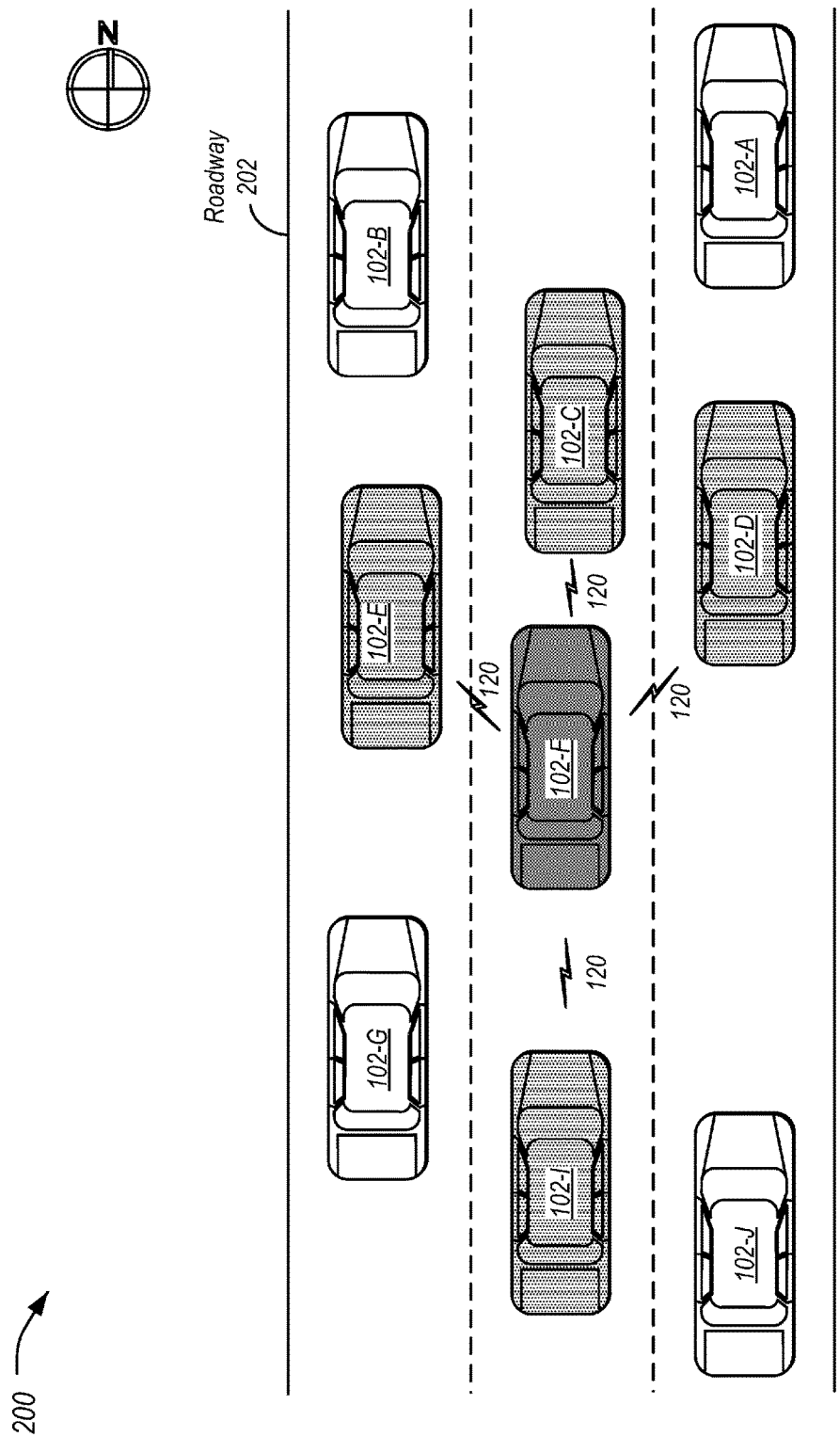
FIG. 2 illustrates an example of vehicles in a connected environment.

FIG. 2 illustrates an example 200 of vehicles 102 in a connected environment. As shown, vehicles 102A through 102J are traversing a roadway 202. The vehicles 102 may communicate connected messages 120 with one another. As shown, the vehicle 102F is communicating connected messages 120 with vehicles 102C, 102D, 102E, and 102I.

However, malicious attacks may be performed that disrupt or corrupt this flow of connected messages 120. Such an attack may be performed can to jam the network, flood the network, or send bogus messages with incorrect information. A proof-of-work approach that leverages the existing broadcast connected messages 120 may be utilized to address these types of attacks, thereby authenticating node-based results received from task given to other nodes.

The described approach utilizes data in the connected messages 120 received from neighbor vehicles 102 to calculate proof-of-work, where the result of this proof-of-work is added in a reserve section of the connected messages 120 sent by the vehicle 102 itself. Continuing with example of the vehicle 102F, the vehicle 102F may communicate connected messages 120 with the vehicle 102F in front of, and to the sides of the vehicle 102F (e.g., vehicles 102C, 102D, 102E, and 102I as shown).

Figure 3:
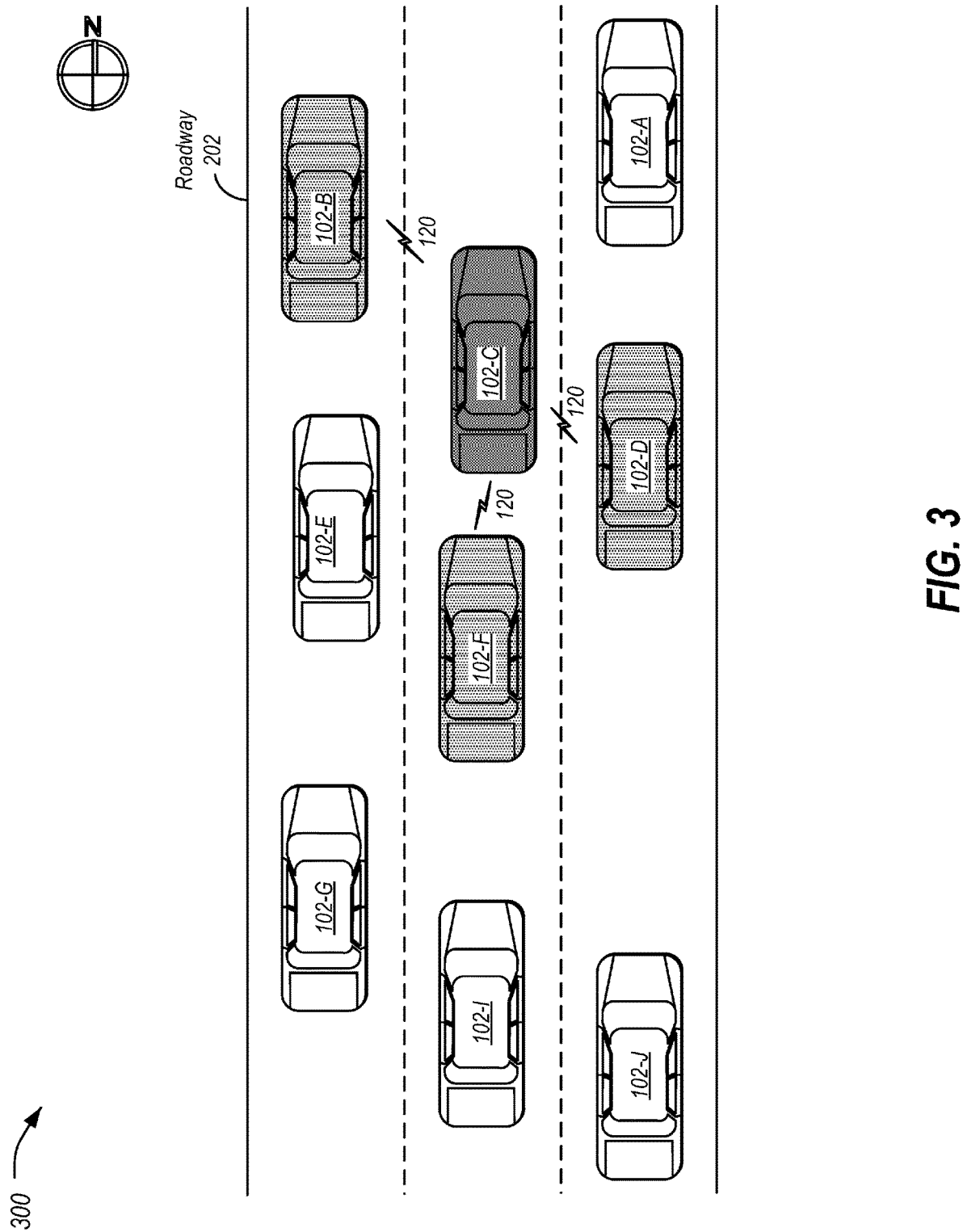
FIG. 3 illustrates an additional example of vehicles in a connected environment.

FIG. 3 illustrates an additional example 300 of vehicles 102 in a connected environment. In the example, there are two potential vehicles 102 (i.e., vehicle 102B and vehicle 102E) by one side of an ego vehicle 102C (e.g., the actor in this scenario). In such a case, one of the two vehicles 102 may be randomly chosen (e.g., one of vehicle 102B or vehicle 102E). It should also be noted that the communications being between a vehicle and its four neighbors is just an example, and more, fewer, or differently located arrangements of communicating vehicles 102 may be used.

Figure 4:
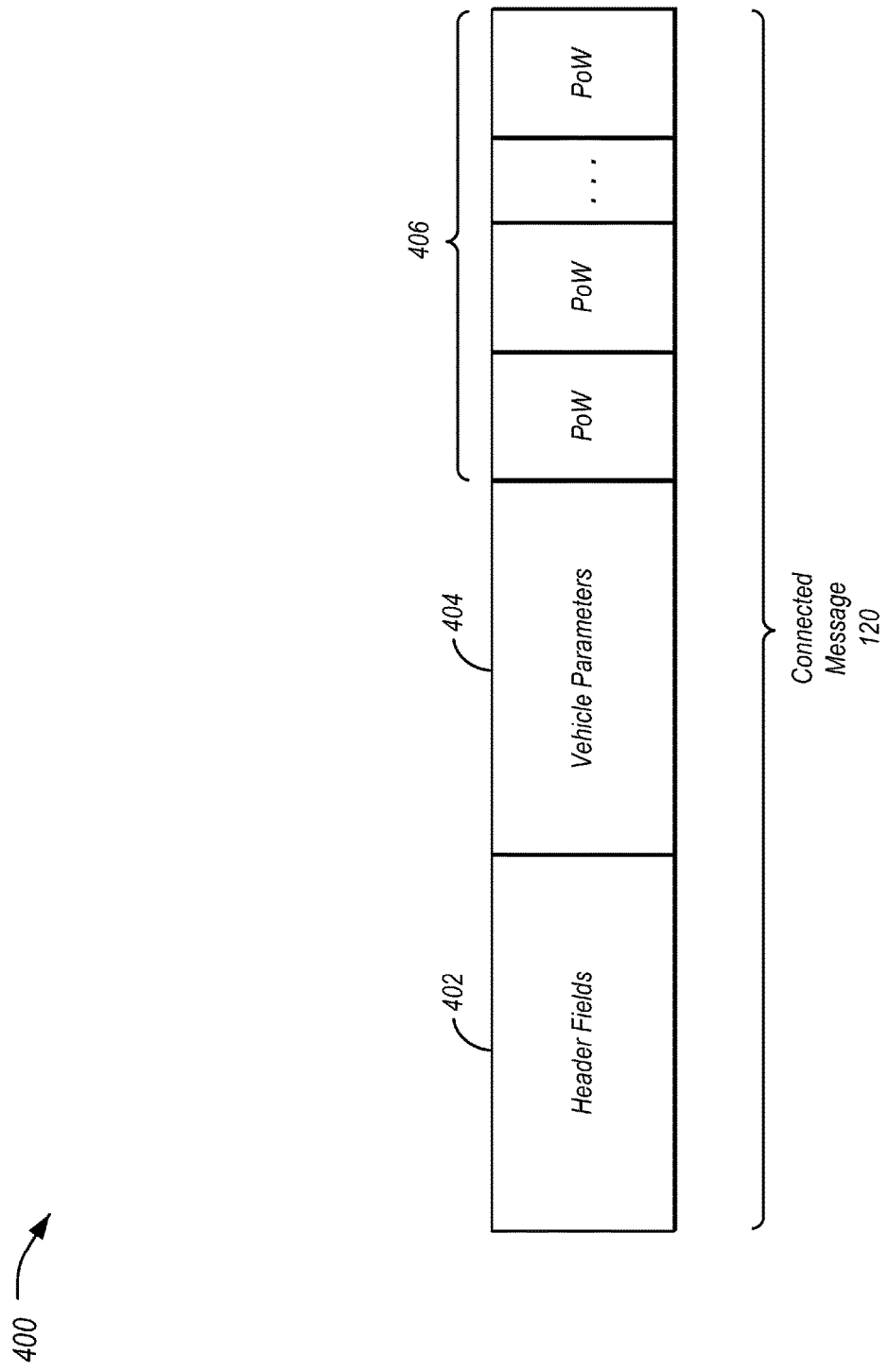
FIG. 4 illustrates an example of a connected message data packet.

FIG. 4 illustrates an example 400 of a connected message 120 data packet. As shown, the example connected message 120 includes a header field 302, vehicle parameters 304, and plurality of instance of proof-of-work 306. The header field 302 may include information such as packet version, packet type, security information, packet length, etc. The vehicle parameters 304 may include information such as the elements of connected vehicle data 116 described above. To continue with the example of a layout of four adjacent vehicles 102, the proof-of-work 306 may include a proof-of-work 306A for the vehicle 102 that is North of the vehicle 102 creating the connected message 120, a proof-of-work 306B for the vehicle 102 that is South of the vehicle 102 creating the connected message 120, a proof-of-work 306C for the vehicle 102 that is East of the vehicle 102 creating the connected message 120, and a proof-of-work 306D for the vehicle 102 that is West of the vehicle 102 creating the connected message 120.

With continued reference to the vehicle 102C as shown in the example 300, the vehicle 102C may perform a proof-of-work computation using data from vehicles 102B, 102D, and 102F. The data to be used in performing the computation of each of the proof-of-work values includes data from the respective vehicles 102B, 102D, and 102F. For instance, the pseudonym, speed, and acceleration of the vehicle 102B may be used in the computation of the proof-of-work for the vehicle 102B, which is the proof-of-work 306D for the vehicle 102 that is West of the vehicle 102. It should be noted that more, fewer, or different data elements may be used, but that the elements that are used should be standardized to ensure interoperability between vehicles 102. Moreover, it should also be noted that the result of the proof-of-work calculations using vehicle 102B is independent of the calculations performed using the data of vehicle 102D and of vehicle 102F, and vice versa. The results of these proof-of-work computations (e.g., $PoW_B$, $POW_D$ and $POW_F$) are added to the proof-of-work 306 elements of the connected message 120 data packet. The vehicle 102C may then broadcast the connected message 120.

As another example, the vehicle 102I may also be used as an ego vehicle 102. In this example, the vehicle 102I receives connected messages 120 from vehicles 102G, 102F, and 102J. The vehicle 102I also performs the proof-of-work using data for from vehicles 102G, 102F, and 102J to generate corresponding proof-of-work results $PoW_G$, $PoW_F$ and $PoW_J$.

As verification of the proof-of-work, the vehicle 102I may use the location of vehicle 102C (e.g., the global navigation satellite system (GNSS) location of the vehicle 102C may be contained in and retrieved from the connected message 120 sent out by vehicle 102C) to verify if the vehicle 102C is on the North side, East side, etc., location with respect to the ego vehicle 102I. Having found the vehicle 102C to be on the North based on the relative locations of the vehicle 102I and the vehicle 102C, the vehicle 102I also identifies vehicle 102F on the North and in close proximity to vehicle 102C. Using the GNSS coordinates as contained in both the connected messages 120 from vehicle 102C and vehicle 102F, the vehicle 102I can identify that the vehicle 102F is behind (to the South of vehicle 102C in the example). Moreover, comparing the proof-of-work done using the data with respect to vehicle 102F, the vehicle 102I can verify that vehicle 102C actually performed the proof-of-work.

Figure 5:
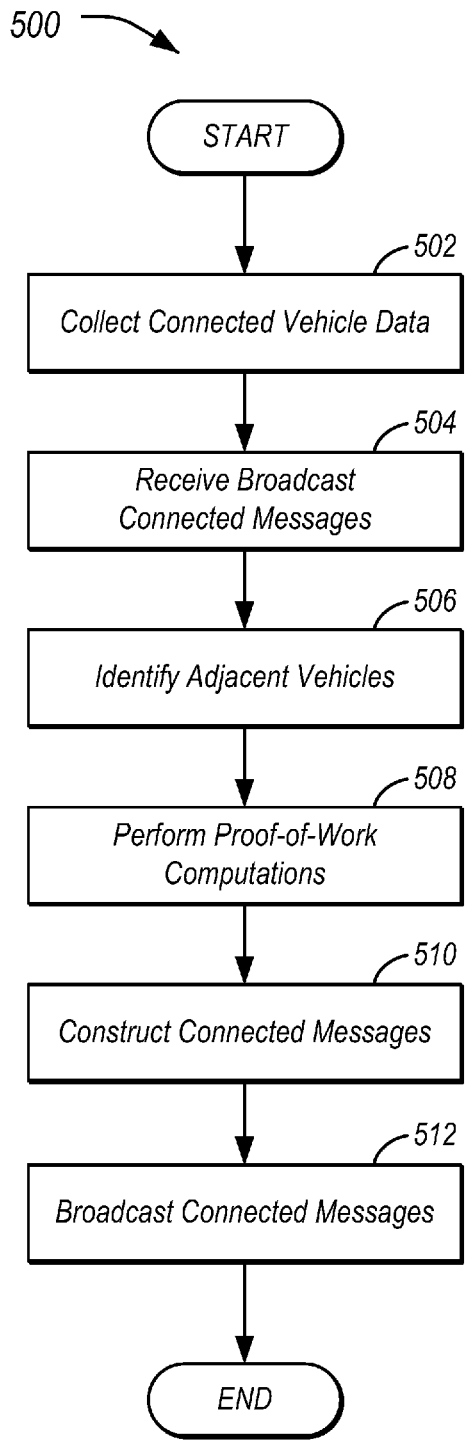
FIG. 5 illustrates an example process for broadcasting connected messages including proof-of-work.

FIG. 5 illustrates an example process 500 for broadcasting connected messages 120 including proof-of-work. In an example, the process 50 may be performed by one of the vehicles 102 as described in detail herein.

At operation 502, the vehicle 102 collects connected vehicle data 116. In an example, the TCU 108 collects information retrieved from the controllers 104 over the vehicle buses 106. This information may include, as some examples, latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. The connected vehicle data 116 information may also include, weather data (such as ambient temperature, ambient air pressure, etc.), traction control status, wiper status, or other vehicle status information (such as the status of exterior vehicle lights, type of vehicle, ABS system status, etc.)

At operation 504, the vehicle 102 receives connected messages 120 from other vehicles 102. In an example, the TCU 108 receives, via the modem 110, connected messages 120 from one or more neighbor vehicles 102.

At operation 506, the vehicle 102 identifies adjacent vehicles 102 for which to perform proof-of-work. In an example, the connected messages 120 include GNSS coordinates, and the TCU 108 identifies the relative locations of the vehicles 102 that broadcast the received connected messages 120 according to the locations in the connected messages 120 as compared to the location of the receiving vehicle 102 itself. In one non-limiting example, the vehicle 102 may identify the other vehicles 102 that are in-front of, behind, and to the side of the vehicle 102. In another non-limiting example, the vehicle 102 may identify the other vehicles 102 that are North, South, East and West of the vehicle 102 itself. Based on the comparisons, the vehicle 102 identifies a set of close vehicles 102, or neighbor vehicles 102, for which to perform proof-of-work computations.

At operation 508, the vehicle 102 performs the proof-of-work computations for the identified vehicles 102 using information received in the connected messages 120. As some non-limiting examples, the proof-of-work computations include partial hash inversions, Fiat-Shamir signatures, hash sequences, Diffie-Hellman, Mbound, Hokkaido, Cuckoo Cycle, and/or a Merkle tree-based computation. The values used for performing the proof-of-work may include information from the received broadcast connected messages 120, such as pseudonym, speed, acceleration etc.

At operation 510, the vehicle 102 constructs connected messages 120 including the connected vehicle data 116 and the proof-of-work. For instance, the connected messages 120 may include aspects of the connected vehicle data 116 along with the computed proof-of-work for the neighbor vehicles 102. In one specific example, the connected messages 120 are BSM messages as described in the SAE J2735, and the proof-of-work computations are stored to the reserve section of the BSMs. At operation 512, the vehicle 102 broadcasts the connected messages 120. After operation 510, the process 500 ends.

Figure 6:
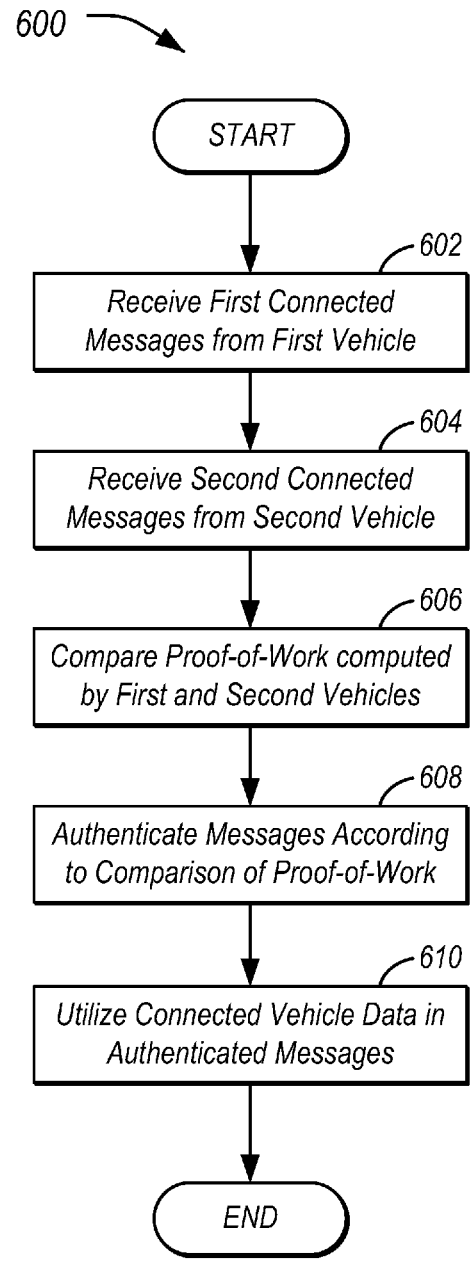
FIG. 6 illustrates an example process for verifying connected messages according to proof-of-work.

FIG. 6 illustrates an example process 600 for verifying connected messages 120 according to proof-of-work. In an example, as with the process 500, the process 600 may be performed by one of the vehicles 102 as described in detail herein.

At operation 602, the vehicle 102 receives first connected messages 120 from a first vehicle 102. At operation 604, the vehicle 102 receives second connected messages 120 from a second vehicle 102. In an example, the connected messages 120 are received by the TCU 108 using the modem 110.

At operation 606, the vehicle 102 compares proof-of-work computed by the first vehicle 102 and the second vehicle 102. In an example, the TCU 108 may retrieve the proof-of-work from the connected messages 120, determine for which vehicles 102 the proof-of-work was computed, and identify vehicles 102 in common in the proof-of-work from the first and second connected messages 120.

At operation 608, authenticates the connected messages 120 according to a comparison of the proof-of-work. If the proof-of-work from the first and second connected messages 120 for the same vehicle 102 is a match, then the connected messages 120 can be assumed to be authentic. For instance, the proof-of-work may be considered a match if the proof-of-work values are identical. If the proof-of-work does not match, then the connected messages 120 may be indicated as being inauthentic or potentially inauthentic. Once authenticated, at operation 610, the connected vehicle data 116 included in the connected messages 120 may be utilized. As some examples, the connected vehicle data 116 may be used for autonomous vehicle operations or driver-assistance vehicle operations. After operation 610, the process 600 ends.

Accordingly, the described proof-of-work approach leverages existing broadcast connected messages 120 to authenticate vehicle 102 communications. As the verification cost of the proof-of-work is substantially less than the cost of computing the proof-of-work, the computational burden places on vehicles 102 to authenticate the connected messages 120 is manageable. By authenticating the connected messages 120, the vehicles 102 can address various types of attacks in which malicious or extraneous connected messages 120 are broadcast.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for using proof-of-work for authentication of messages between vehicles, comprising:
   a controller of an ego vehicle, programmed to:
      receive a first connected message broadcast from a first vehicle and a second connected message broadcast from a second vehicle, wherein the first connected message broadcast from the first vehicle includes proof-of-work computed by the first vehicle for a first plurality of vehicles in the vicinity of the first vehicle, and the second connected message broadcast from the second vehicle includes proof-of-work computed by the second vehicle for a second plurality of vehicles in the vicinity of the second vehicle, the second plurality of vehicles being different from the first plurality of vehicles, the first and second pluralities of vehicles each including a third vehicle,
      identify vehicles in common in the proof-of-work from the first and second connected messages, the vehicles in common including the third vehicle, each of the first and second connected messages including proof-of-work computed from connected vehicle data regarding the third vehicle,
      authenticate the first and second connected messages responsive to a comparison of the proof-of-work corresponding to each of the vehicles in common, the authenticate including to compare the proof-of-work for the third vehicle included in the first connected message to the proof-of-work for the third vehicle included in the second connected message, and
      utilize connected vehicle data in the first connected message broadcast or second connected message broadcast responsive to the proof-of-work for the vehicles in common being a match.

2. The system of claim 1, wherein the controller of the ego vehicle is further programmed to:
   collect ego vehicle connected vehicle data for the ego vehicle,
   identify vehicles adjacent to the ego vehicle to determine a set of neighbor vehicles according to location information included in the broadcast connected messages,
   perform ego vehicle proof-of-work computations on data elements included in the broadcast connected messages received from the neighbor vehicles, and
   send connected messages including at least a subset of the connected vehicle data and the ego vehicle proof-of-work computations.

3. The system of claim 2, wherein the ego vehicle connected vehicle data includes data received from other controllers of the ego vehicle, the data including one or more of latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, bumper height, ambient temperature, ambient air pressure, traction control status, wiper status, status of exterior vehicle lights, type of vehicle, or brake system status.

4. The system of claim 2, wherein the set of neighbor vehicles includes two or more of: a vehicle in front of the ego vehicle, a vehicle behind the ego vehicle, a vehicle to a left side of the ego vehicle, and a vehicle to the right side of the ego vehicle.

5. The system of claim 2, wherein the ego vehicle proof-of-work computations are performed on a predefined set of data elements included in the received broadcast connected messages, the set of data elements including one or more of: a pseudonym of a vehicle for which proof-of-work is being computed, a speed of the vehicle for which proof-of-work is being computed, or an acceleration of the vehicle for which proof-of-work is being computed.

6. The system of claim 1, wherein to utilize the connected vehicle data includes to utilize the connected vehicle data for autonomous vehicle operations or driver-assistance vehicle operations.

7. A method for using proof-of-work for authentication of messages between vehicles, comprising:
   receiving a first connected message broadcast from a first vehicle and a second connected message broadcast from a second vehicle, wherein the first connected message broadcast from the first vehicle includes proof-of-work computed by the first vehicle for a first plurality of vehicles in the vicinity of the first vehicle, and the second connected message broadcast from the second vehicle includes proof-of-work computed by the second vehicle for a second plurality of vehicles in the vicinity of the second vehicle, the second plurality of vehicles being different from the first plurality of vehicles, the first and second pluralities of vehicles each including a third vehicle;
   identifying vehicles in common in the proof-of-work from the first and second connected messages, the vehicles in common including the third vehicle, each of the first and second connected messages including proof-of-work computed from connected vehicle data regarding the third vehicle;
   authenticating the first and second connected messages responsive to a comparison of the proof-of-work corresponding to each of the vehicles in common, the authenticating including comparing the proof-of-work for the third vehicle included in the first connected message to the proof-of-work for the third vehicle included in the second connected message, and utilizing connected vehicle data in the first connected message broadcast or second connected message broadcast responsive to the proof-of-work for the vehicles in common being a match.

8. The method of claim 7, further comprising:

collecting ego vehicle connected vehicle data for the ego vehicle, identifying vehicles adjacent to the ego vehicle to determine a set of neighbor vehicles according to location information included in the broadcast connected messages, performing ego vehicle proof-of-work computations on data elements included in the broadcast connected messages received from the neighbor vehicles, and sending connected messages including at least a subset of the connected vehicle data and the ego vehicle proof-of-work computations.

9. The method of claim 8, wherein the ego vehicle connected vehicle data includes data received from other controllers of the ego vehicle, the data including one or more of latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, bumper height, ambient temperature, ambient air pressure, traction control status, wiper status, status of exterior vehicle lights, type of vehicle, or brake system status.

10. The method of claim 8, wherein the set of neighbor vehicles includes two or more of: a vehicle in front of the ego vehicle, a vehicle behind the ego vehicle, a vehicle to a left side of the ego vehicle, and a vehicle to the right side of the ego vehicle.

11. The method of claim 8, wherein the ego vehicle proof-of-work computations are performed on a predefined set of data elements included in the received broadcast connected messages, the set of data elements including one or more of: a pseudonym of a vehicle for which proof-of-work is being computed, a speed of the vehicle for which proof-of-work is being computed, or an acceleration of the vehicle for which proof-of-work is being computed.

12. The method of claim 7, wherein to utilize the connected vehicle data includes to utilize the connected vehicle data for autonomous vehicle operations or driver-assistance vehicle operations.

13. A non-transitory computer readable medium comprising instructions for authentication of messages between vehicles, that when executed by a processor, cause the processor to perform operations including to:

receive a first connected message broadcast from a first vehicle and a second connected message broadcast from a second vehicle, wherein the first connected message broadcast from the first vehicle includes proof-of-work computed by the first vehicle for a first plurality of vehicles in the vicinity of the first vehicle, and the second connected message broadcast from the second vehicle includes proof-of-work computed by the second vehicle for a second plurality of vehicles in the vicinity of the second vehicle, the second plurality of vehicles being different from the first plurality of vehicles, the first and second pluralities of vehicles each including a third vehicle;

identify vehicles in common in the proof-of-work from the first and second connected messages, the vehicles in common including the third vehicle, each of the first and second connected messages including proof-of-work computed from connected vehicle data regarding the third vehicle, authenticate the first and second connected messages responsive to a comparison of the proof-of-work corresponding to each of the vehicles in common, the authenticating including comparing the proof-of-work for the third vehicle included in the first connected message to the proof-of-work for the third vehicle included in the second connected message, and utilize connected vehicle data in the first connected message broadcast or second connected message broadcast for autonomous vehicle operations or driver-assistance vehicle operations, responsive to the proof-of-work for the vehicles in common being a match.

14. The medium of claim 13, further comprising instructions that when executed by the processor, cause the processor to perform operations including to:

collect ego vehicle connected vehicle data for the ego vehicle, identify vehicles adjacent to the ego vehicle to determine a set of neighbor vehicles according to location information included in the broadcast connected messages, perform ego vehicle proof-of-work computations on data elements included in the broadcast connected messages received from the neighbor vehicles, and send connected messages including at least a subset of the connected vehicle data and the ego vehicle proof-of-work computations.

15. The medium of claim 14, wherein the ego vehicle connected vehicle data includes data received from other controllers of the ego vehicle, the data including one or more of latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, bumper height, ambient temperature, ambient air pressure, traction control status, wiper status, status of exterior vehicle lights, type of vehicle, or brake system status.

16. The medium of claim 14, wherein the set of neighbor vehicles includes two or more of: a vehicle in front of the ego vehicle, a vehicle behind the ego vehicle, a vehicle to a left side of the ego vehicle, and a vehicle to the right side of the ego vehicle.

17. The medium of claim 14, wherein the ego vehicle proof-of-work computations are performed on a predefined set of data elements included in the received broadcast connected messages, the set of data elements including one or more of: a pseudonym of a vehicle for which proof-of-work is being computed, a speed of the vehicle for which proof-of-work is being computed, or an acceleration of the vehicle for which proof-of-work is being computed.

18. The system of claim 1, wherein the first and second connected messages are BSM messages as described in SAE J2735, and the proof-of-work values are included in a reserve section of the BSM.

19. The method of claim 7, wherein the first and second connected messages are BSM messages as described in SAE J2735, and the proof-of-work values are included in a reserve section of the BSM.

20. The medium of claim 13, wherein the first and second connected messages are BSM messages as described in SAE J2735, and the proof-of-work values are included in a reserve section of the BSM.

* * * * *